(12) United States Patent
Cao

(10) Patent No.: US 8,396,052 B1
(45) Date of Patent: *Mar. 12, 2013

(54) APPARATUS AND METHOD FOR SYNCHRONOUS AND ASYNCHRONOUS SWITCHING OF INTERNET PROTOCOL TRAFFIC

(75) Inventor: Yang Cao, Bradford, MA (US)

(73) Assignee: Alcatel Lucent, Paris (FR)

( * ) Notice: Subject to any disclaimer, the term of this patent is extended or adjusted under 35 U.S.C. 154(b) by 2408 days.

This patent is subject to a terminal disclaimer.

(21) Appl. No.: 09/620,053

(22) Filed: Jul. 20, 2000

(51) Int. Cl.
*H04L 12/66* (2006.01)

(52) U.S. Cl. ......... 370/352; 370/353; 370/356; 370/398

(58) Field of Classification Search .......... 370/351–359, 370/229–236, 395.1, 396, 395.2, 398, 395.21, 370/395.31, 395.41, 395.42, 395.43, 395.5, 370/395.51, 395.61, 395.63, 395.64, 466–468, 370/539, 401, 360, 477; 398/45–51, 74
See application file for complete search history.

(56) References Cited

U.S. PATENT DOCUMENTS

| | | | | |
|---|---|---|---|---|
| 3,999,162 A | * | 12/1976 | Le Roy | 710/316 |
| 4,543,562 A | * | 9/1985 | Ny | 341/22 |
| 4,926,416 A | * | 5/1990 | Weik | 370/354 |
| 5,365,521 A | * | 11/1994 | Ohnishi et al. | 370/352 |
| 5,479,407 A | * | 12/1995 | Ko et al. | 370/231 |
| 5,570,355 A | * | 10/1996 | Dail et al. | 370/352 |
| 5,623,605 A | * | 4/1997 | Keshav et al. | 709/236 |
| 5,764,645 A | * | 6/1998 | Bernet et al. | 370/395.52 |
| 5,832,197 A | * | 11/1998 | Houji | 714/4 |
| 5,920,412 A | * | 7/1999 | Chang | 398/83 |
| 5,953,338 A | * | 9/1999 | Ma et al. | 370/395.21 |
| 5,956,342 A | * | 9/1999 | Manning et al. | 370/414 |
| 5,982,771 A | * | 11/1999 | Caldara et al. | 370/389 |
| 6,115,373 A | * | 9/2000 | Lea | 370/355 |
| 6,147,999 A | * | 11/2000 | Honda et al. | 370/396 |
| 6,160,793 A | * | 12/2000 | Ghani et al. | 370/236 |
| 6,317,426 B1 | * | 11/2001 | Afanador et al. | 370/352 |
| 6,317,439 B1 | * | 11/2001 | Cardona et al. | 370/503 |
| 6,324,165 B1 | * | 11/2001 | Fan et al. | 370/232 |
| 6,330,239 B1 | * | 12/2001 | Suzuki | 370/395.1 |
| 6,381,238 B1 | * | 4/2002 | Hluchyj | 370/352 |
| 6,385,171 B1 | * | 5/2002 | Takase et al. | 370/235 |
| 6,483,842 B1 | * | 11/2002 | Mauger | 370/420 |

(Continued)

OTHER PUBLICATIONS

M. Garret and M. Borde, RFC 2381, Interoperation of Controlled-load service and Guaranteed Service with ATM, Aug. 1998. (Section 2.1).*

*Primary Examiner* — Ian N Moore
*Assistant Examiner* — Jackie Zuniga
(74) *Attorney, Agent, or Firm* — Capitol Patent & Trademark Law Firm, PLLC

(57) ABSTRACT

A hybrid telecommunications switch includes circuit and packet switch fabrics, and a controller. The controller is configured to map IP traffic into ATM service categories, to separate incoming IP from circuit switched traffic and to provide access, through a connection admission control (CAC) protocol to a circuit switched fabric for IP traffic. Real-time traffic, such as voice traffic, may be separated from non-real-time traffic, such as Internet email traffic. Once separated, the real time traffic may be switched through a circuit switch fabric and the non-real-time traffic maybe switched through a packet switch fabric. IP traffic, such as that mapped into CBR and rt-VBR ATM service categories may aggregated "on-the-fly", that is, without pre-provisioning, and switched through the hybrid switch's circuit switch fabric. IP traffic mapped into other ATM service categories is routed through a packet switch fabric.

42 Claims, 6 Drawing Sheets

U.S. PATENT DOCUMENTS

| | | | |
|---|---|---|---|
| 6,487,206 B1 * | 11/2002 | Baruch et al. | 370/395.1 |
| 6,574,224 B1 * | 6/2003 | Brueckheimer et al. | 370/395.6 |
| 6,639,910 B1 * | 10/2003 | Provencher et al. | 370/351 |
| 6,657,757 B1 * | 12/2003 | Chang et al. | 370/471 |
| 6,674,750 B1 * | 1/2004 | Castellano | 370/354 |
| 6,707,825 B1 * | 3/2004 | Turner et al. | 370/467 |
| 6,865,179 B1 * | 3/2005 | Cao | 370/352 |
| 7,266,110 B1 * | 9/2007 | Cao et al. | 370/352 |

* cited by examiner

APPARATUS AND METHOD FOR SYNCHRONOUS AND ASYNCHRONOUS SWITCHING OF INTERNET PROTOCOL TRAFFIC

FIELD OF THE INVENTION

The invention relates to telecommunications systems and, more particularly, to the efficient switching of Internet Protocol (IP) traffic using circuit and packet switched fabrics, the packet switched fabrics including IP router switch fabrics and asynchronous transfer mode (ATM) switch fabrics.

BACKGROUND OF THE INVENTION

In eighteen seventy-six, inside a third floor walk-up garret apartment in the Scollay Square section of Boston Mass., only a short distance from the sight of the first battle of the revolutionary war, Alexander Graham Bell spoke the first words transmitted over telephone wires. Bell's transmission of sound over telephone wires initiated a revolution in communications whose scope rivals that of the political revolution initiated by the sound, heard nearby, of "the shot heard round the world."

Technical innovations have dramatically transformed the telecommunications industry in the ensuing years. For example, telecommunications switching systems have evolved considerably from "hand operated" systems in which one instrument was electrically connected (through a hierarchical switching network) to another with the intervention of a human operator who would physically plug one circuit into another. Such direct electrical connection of two or more channels between two points (at least one channel in each direction), a connection that provides a user with exclusive use of the channels to exchange information, is referred to as circuit switching, or line switching. Human operators have largely been replaced by systems which employ electronic switching systems (ESS, e.g., 5ESS), in which the instruments are automatically connected through the network by electronic systems. Nevertheless, such switching systems often still employ circuit switching, a technique which yields highly reliable service, particularly for such "real time" communications applications as voice, in which the momentary loss of a channel is annoying, and repeated such losses are unacceptable.

Not only has switching technology undergone major changes, the type of traffic being carried on telephone lines has also changed dramatically. Although originally designed for voice traffic and "tuned" to operation in the voice band between approximately 350 and 4000 Hz, the telecommunications infrastructure also carries data, through the use of various channels, or tones. However, with the growing use of the Internet, and the potential development such high bandwidth applications such as interactive distance-learning and video on demand, the existing telecommunications infrastructure is in danger of being overwhelmed. A large portion of the system's transmission medium has been replaced with high speed trunks which employ fiber optic transmission media, microwave media, and line of sight optical media, for example, to meet the ever mounting demand for high speed data transmission capability. Data traffic is increasing at a rate of approximately 300% per year, while voice traffic is only increasing at the relatively slow rate of approximately 5% per year. However, a huge installed base of transmission media, switching devices, and other telecommunications infrastructure provide the telecommunications path for the vast majority of telecommunications providers and users.

Attempts have been made to address quality of service issues that arise, for example, when time-sensitive traffic, such as voice traffic, is transmitted over an internet protocol (IP) network. Since IP was directed, after all, primarily toward the transmission of data, "best effort" transmission was judged to provide sufficient quality for IP transmission and, generally, quality of service was not addressed. However, with the confluence of real-time and non-real-time traffic on networks that may include both circuit and packet switching facilities, conventional approaches to accommodating traffic having varied quality of service requirements under-utilize resources or fail to meet quality of service requirements. Although quality of service categories are available for asynchronous transfer mode (ATM) traffic, the various quality of service categories supported by ATM, and the concomitant varied requirements, exacerbate the difficulty of modeling an ATM compatible switching system. Consequently, many conventional ATM systems either employ conservative systems modeling, which results in underutilized facilities such as bandwidth and/or buffers, or aggressive modeling, which degrade system performance.

A system and method that enable the efficient combination and management of circuit-switched and packet-switched facilities, thereby taking advantage of the tremendous installed base of equipment and facilities while, at the same time, permitting an extensive upgrade of data facilities, which typically employ packet switching systems, would prove advantageous. In particular, a system and method that provides such advantages for IP traffic would be highly desirable.

RELATED APPLICATIONS

Patent Applications entitled, "Apparatus and Method For Hybrid Switching", and "Apparatus and Method For Synchronous and Asynchronous Switching of ATM Traffic", filed on the same day as this application and assigned to the same assignees as this application is assigned are hereby incorporated by reference.

SUMMARY

A telecommunications management system and method in accordance with the principles of the present invention includes facilities for managing telecommunications switching in a system that includes both circuit switching and packet switching facilities. The circuit switching facilities may use a Synchronous Transport Signal (STS) crossconnect with interfaces to SONET rings, for example, while the packet switching facility switches ATM cells. In one aspect of the invention, real-time traffic, such as voice traffic, may be separated from non-real-time traffic, such as Internet email traffic. Once separated, the real time traffic may be switched through a synchronous transfer mode (STM) switch fabric, which may also be referred to herein as a circuit-switched switch or time division multiplexed (TDM) switch fabric. The non-real-time traffic may be switched through an asynchronous transfer mode (ATM) switch fabric.

In accordance with the principles of the present invention a hybrid switch includes packet and circuit switching switch fabrics, a controller, which may be referred to hereinafter as a hybrid switch resource manager, and one or more input/output ports (I/O port). Telecommunications traffic enters the switch and, after the traffic is switched, departs to telecommunications network through the I/O port(s). A new connection admission control (CAC) process is employed by the controller to route Internet Protocol (IP) traffic to either a circuit switch fabric, such as an STM switch fabric, or to packet switch fabric, such as an IP switch fabric. Because the traffic load is shared, in parallel fashion, between the circuit and packet fabrics, neither switch need be of sufficient magnitude to accommodate the entire traffic load.

In an illustrative embodiment the hybrid switch's controller maps IP traffic into an appropriate ATM service category. IP traffic that is mapped into an ATM service category, such as CBR, or rt-VBR, is aggregated "on-the-fly" and switched through the hybrid switch's circuit switched switch fabric. IP traffic that is mapped into another ATM service category is directed to a packet switch fabric for switching in that fabric. As a result, a hybrid switch in accordance with the principles of the present invention provides efficient use of circuit and packet switch fabrics, the overall bandwidth of the switch, and buffers used for access to the switch.

In accordance with the principles of the present invention all IP traffic that is mapped into an ATM CBR service category may be aggregated and switched through a circuit switch fabric. IP traffic that is mapped into ATM rt-VBR service category may be switched through a packet switch fabric in a conventional manner or it may be switched in the same fashion as ATM CBR traffic. IP traffic mapped into other categories may be switched through the hybrid switch's packet switch fabric.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

Figure 1:
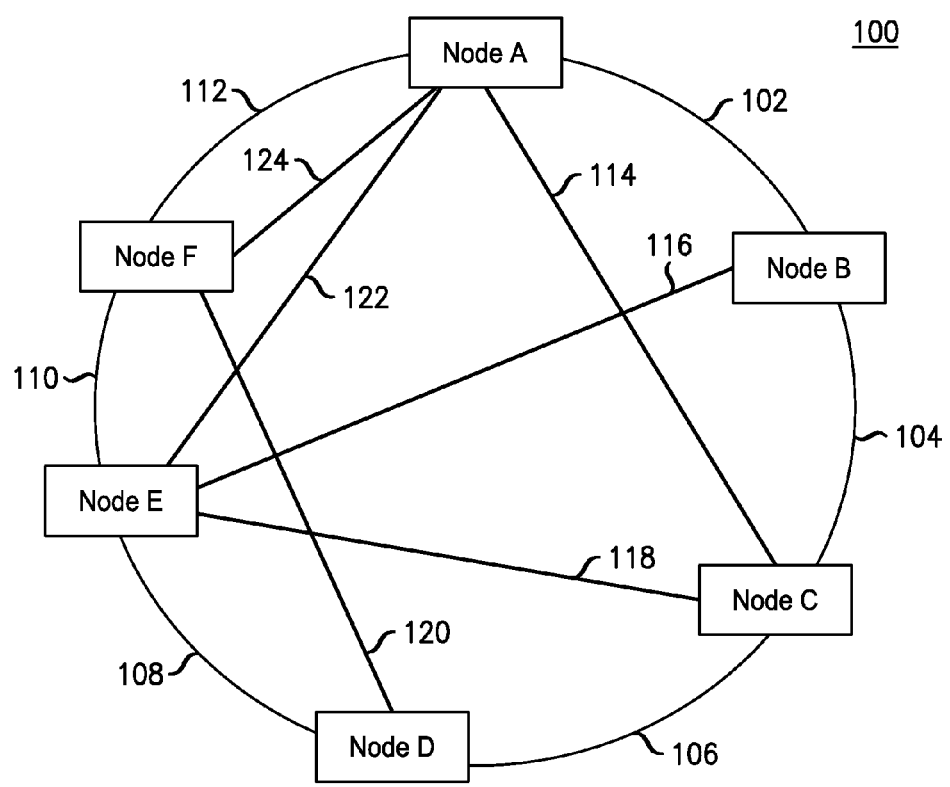
FIG. 1 is a conceptual block diagram which illustrates a network of hybrid switches in accordance with the principles of the present invention.

A hybrid telecommunications switch in accordance with the principles of the present invention includes both circuit switching and packet switching facilities and a management system and method for allocating traffic among the switching facilities. The circuit switching facilities may employ a Synchronous Transport Signal (STS) cross-connect with interfaces to SONET rings, for example, and the packet switching facility may use an IP switch fabric for switching traffic in the form of IP packets, or, alternatively, an ATM switch fabric may be employed. In one aspect of the invention, traffic for which circuit switching may be more appropriate may be separated from traffic that is more suitably handled by packet switching facilities. That is, for example, real-time traffic, such as voice traffic, may be more appropriately handled by a circuit switching facility, and non-real-time traffic, such as Internet email traffic, may be more suitably handled by a packet switching facility. After separation, the real-time traffic may be switched through an STM switch fabric and the non-real time traffic, which may be ATM traffic of types described below, may be switched through a packet switch fabric.

The new hybrid switches may be connected in any of a variety of network topologies. For ease and clarity of description, the illustrative embodiment of FIG. 1 includes six hybrid switches in accordance with the principles of the invention (Node A, Node B, Node C, Node D, Node E and Node F) that are connected in a ring 100, in which Nodes A and B are connected through a link 102, Nodes B and C are connected through a link 104, Nodes C and D are connected through a link 106, Nodes D and E are connected through a link 108, Nodes E and F are connected through a link 110, and Nodes F and A are connected through a link 112. As described in greater detail in the discussion related to FIGS. 2 and 3, each of the hybrid switches (any of the nodes Node A through Node F) includes circuit switch facilities, such as STM switch fabric facilities, packet switch facilities, such as IP switch fabric facilities, Input/Output facilities and a switch manager that, in accordance with principles of the invention, examines incoming traffic and route the traffic to an appropriate switching facility within the hybrid switch. As previously noted, the invention may apply to other network topologies, such as meshes (wherein the nodes A through F may be connected through links 114, 116, 118, 120, 122, and 124, for example). Additionally, within the context of a ring topology, each of the nodes may be connected to a plurality of rings. The illustrative embodiment of FIG. 1 was chosen for clarity and simplicity of explanation. Furthermore, although the invention will be discussed in the context of employing a SONET/SDH physical link media, the invention may be used in conjunction with networks that employ other physical media.

Figure 2:
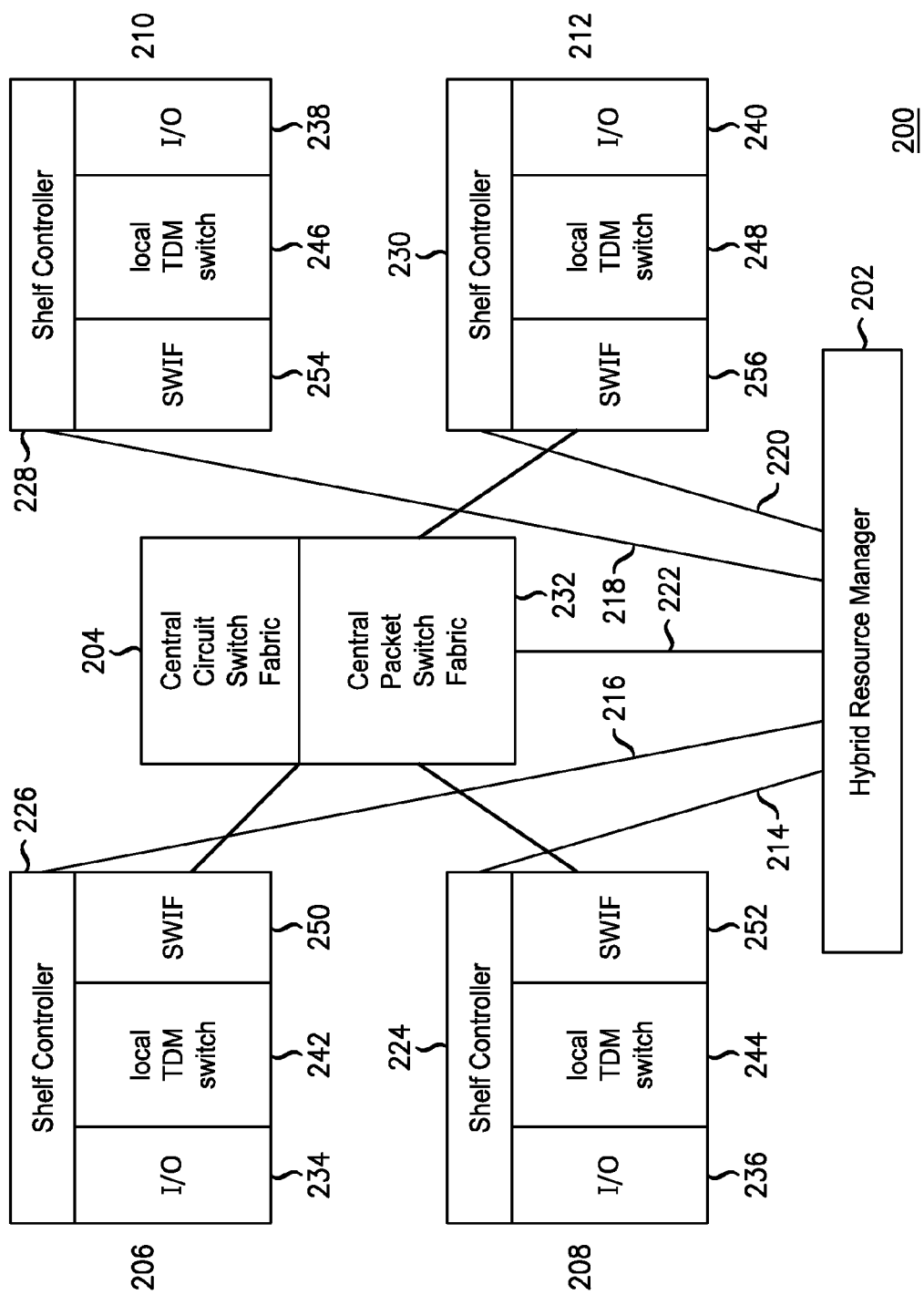
FIG. 2 is a conceptual block diagram of a hybrid telecommunications switch in accordance with the principles of the present invention.

Each of the Nodes A through F of FIG. 1 includes components such as illustrated in the conceptual block diagram of FIG. 2. The node 200 includes a controller 202, also referred to herein as a hybrid resource manager 202, a central circuit switch fabric 204, a central packet switch fabric 232, and a plurality of STM units 206, 208, 210, and 212. The hybrid resource manager 202 operates to manage the switch resources through respective communications links 214, 216, 218, 220, and 222 to shelf controllers 224, 226, 228, 230, and a central packet switch fabric 232. The central packet switch fabric in this illustrative embodiment is an asynchronous transfer mode (ATM) switch fabric. The STM units 206, 208, 210 and 212 respectively include input/output (I/O) interfaces 234, 236, 238, and 240, local switch fabrics, 242, 244, 246, and 248, and switch interfaces, 250, 252, 254, and 256. An I/O interface, such as I/O interface 234 may provide a connection to another network element, or node, through a link such as the link 102 which connects nodes A and B of FIG. 1. Traffic arriving at one of the I/O interfaces is routed under control of the hybrid resource manager 202 by a shelf controller, which more directly controls the operation of a local STM switch. Each of the local STM switches may be, for example, an STS-1 level cross-connect. The capacity of the cross-connect may be related to the I/O capacity of the corresponding I/O interface. That traffic which is routed to the central packet switch fabric 232 may be directed through a switch interface, such as SWIF 250, embodied as an advanced "UTOPIA" interface which is capable of transferring both ATM cells and packet-based traffic.

As described in greater detail in the discussion related to FIGS. 2, 3, 4 and 5, the hybrid resource manager partitions incoming traffic into streams that are to be switched either by an STM switch fabric or an IP switch fabric. The STM traffic may be switched in a local STM switch, such as local STM switch 242, for example, or it may be switched through a central STM switch fabric 204 (optional). Typically, a single ring SONET/SDH embodiment would require only one STM unit, such as the unit 206, to provide an interface to the ring and to provide the STM switching function. A multi-ring or mesh connection would include a plurality of the STM units, as illustrated. In such as case, the STM switching may be provided by a central STM switch fabric 204 which could direct traffic into and out of any of the I/O interfaces and to the packet switch fabric 232, as needed. Alternatively, traffic entering one STM unit could be packetized and switched through the central packet switch fabric 232 to travel between I/O interface 234 and I/O interface 240, for example. Each of the I/O interfaces, such as I/O 234, acts as a ring, or line, interface. IP traffic is first mapped into an ATM service category, then switched. The resource manager may perform the IP-to-ATM mapping process, for example. After thus mapping IP into ATM traffic categories, the hybrid resource manager 202 communicates with the next node in a path of which it is a part and determines, "on the fly", which switch fabric, such as a local STM 242, central packet 232 or central circuit 204, will be employed to switch traffic associated with the IP traffic. This decision is based upon the ATM service category into which the IP traffic has been mapped.

Figure 3:
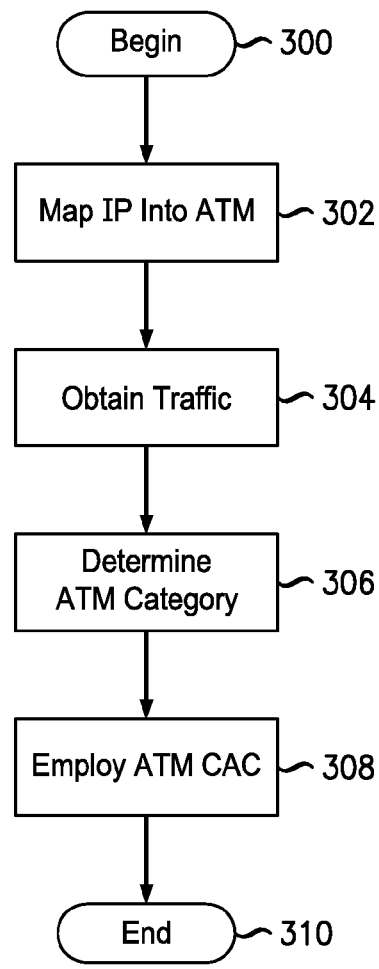
FIG. 3 is a flowchart which depicts the overall operation of the hybrid telecommunications switch in switching IP traffic.

An overview of the process by which a hybrid switch services IP traffic in accordance with the principles of the present invention is provided by the flow chart of FIG. 3. The process begins in step 300 and proceeds from there to step 302, where various types of IP traffic is mapped into ATM service categories. This mapping process may take place "offline", with the mappings downloaded to the hybrid switch's resource manager or the resource manager may perform the mapping "on the fly", in which case, the mappings may be changed to accommodate various requirements.

The IP-to-ATM mapping allows the hybrid switch to employ it's connection admission control CAC process to provide access to its switching facilities in much the same way that it would provide access to ATM traffic. As described in greater detail below, the IP traffic is routed to either an STM or an IP switch fabric within the hybrid switch, depending upon which ATM service category the IP traffic has been mapped into. Although there are a variety of IP reservation protocols, such as resource reservation setup protocol (RSVP), or constraint based routing label distribution protocol (CRLDP), they all contain a traffic description that describes the characteristics of the IP packet flow. A hybrid switch in accordance with the principles of the present invention employs these IP packet flow descriptions as an interface to the CAC process. Although the following illustrative example will be employ details of an RSVP protocol for illustrative purposes, as will be obvious to one skilled in the art, the new hybrid switch may be operated in conjunction with a wide variety of IP reservation protocols, including CRLDP with multi-protocol label switching (MPLS).

An IP signaling protocol, such as RSVP operates as the IP counterpart to the ATM in-band signaling protocol employed to reserve resources within each node along a path through which traffic is to follow. That is, such protocols are employed to reserve resources along the projected path of the IP traffic, just as ATM in-band protocols are employed to reserve resources for ATM traffic prior to carrying the traffic. An IP signaling protocol message, such as an IP RSVP message, will include information that the new hybrid switch may employ to provide IP traffic with a desired quality of service. An IP RSVP message, "Adspec", for example, is transmitted by a sending node to inform receiving nodes of the characteristics of the desired end-to-end communications path. This information is used by the receivers to determine the level of reservation required in order to achieve the desired end to end QoS.

Service categories available to IP traffic include, Guaranteed Service (GS), Controlled Load Service (CLS), and Best Effort (BE). Each of these IP traffic categories may be mapped into an ATM service category, such as CBR, rt-VBR, nrt-VBR, UBR, or ABR. Various mapping procedures are possible and discussed for example in, M. Garrett, M. Borden, Interoperation of Controlled-Load Service and Guaranteed Service with ATM, ftp://ftp.isi.edu/in-notes/rfc2381.txt, which is hereby incorporated by reference.

In further detail to appropriately map Guaranteed Service (GS) categorized IP traffic to ATM service levels, real-time timing is required. In addition, data flows may have a variable rate, and non-conforming traffic must be demoted, so-to-speak, to a Best Effort service category. For this reason, rt-VBR or CBR ATM service levels can be used.

Table 1-1 lists some of the key parameters involved in mapping Guaranteed Service categorized, IP traffic to an rt-VBR, ATM service level.

TABLE 1-1

| AAL | |
|---|---|
| Type | 5 |
| Forward CPCS-SDU Size | parameter M of rcvr TSpec + 8 Bytes |
| Backward CPCS-SDU Size | parameter M of rcvr TSpec + 8 Bytes |
| SSCS Type | 0 (Null SSCS) |
| Traffic Descriptor | |
| Forward PCR CLP = 0 + 1 | |
| Backward PCR CLP = 0 + | 0 |
| Forward SCR CLP = 0 | |
| Backward SCR CLP = 0 | 0 |
| Forward MBS (CLP = 0) | |
| Backward MBS (CLP = 0) | 0 |
| BE indicator | NOT included |
| Forward Frame Discard bit | 1 |
| Backward Frame Discard bit | 1 |
| Tagging Forward bit | 1 (Tagging requested) |
| Tagging Backward bit | 1 (Tagging requested) |
| Broadband Bearer Capability | |
| Bearer Class | 16 (BCOB-X) |
| ATM Transfer Capability | 9 (Real time VBR) |
| Susceptible to Clipping | 00 (Not Susceptible) |
| User Plane Configuration | 01 (Point-to-Multipoint) |
| Broadband Low Layer Information | |
| User Information Layer 2 | |
| Protocol | 12 (ISO 8802/2) |
| User Information Layer 3 | |
| Protocol | 11 (ISO/IEC TR 9577) |
| ISO/IEC TR 9577 IPI | 204 |
| QoS Class | |
| QoS Class Forward | 1 |
| QoS Class Backward | 1 |
| Extended QoS Parameters | |
| Acceptable Forward CDV | |
| Acceptable Forward CLR | |

Table 2-1 lists some of the key parameters involved in mapping Guaranteed Service categorized, IP traffic to a CBR, ATM service level.

TABLE 2-1

| AAL | |
|---|---|
| Type | 5 |
| Forward CPCS-SDU Size | parameter M of rcvr TSpec + 8 Bytes |
| Backward CPCS-SDU Size | parameter M of rcvr TSpec + 8 Bytes |
| SSCS Type | 0 (Null SSCS) |
| Traffic Descriptor | |
| Forward PCR CLP = 0 + 1 | |
| Backward PCR CLP = 0 + 1 | 0 |
| BE indicator | NOT included |
| Forward Frame Discard bit | 1 |
| Backward Frame Discard bit | 1 |
| Tagging Forward bit | 0 (Tagging not requested) |
| Tagging Backward bit | 0 (Tagging not requested) |
| Broadband Bearer Capability | |
| Bearer Class | 16 (BCOB-X) |
| ATM Transfer Capability | 5 (CBR) |
| Susceptible to Clipping | 00 (Not Susceptible) |
| User Plane Configuration | 01 (Point-to-Multipoint) |
| Broadband Low Layer Information | |
| User Information Layer 2 | |
| Protocol | 12 (ISO 8802/2) |
| User Information Layer 3 | |
| Protocol | 11 (ISO/IEC TR 9577) |
| ISO/IEC TR 9577 IPI | 204 |
| QoS Class | |
| QoS Class Forward | 1 |
| QoS Class Backward | 1 |
| Extended QoS Parameters | |
| Acceptable Forward CDV | |
| Acceptable Forward CLR | |
| Forward Max CTD | |

Turning now to IP traffic that is required to meet a Controlled Load service (CLS), it should be noted that CLS traffic is partly delay tolerant and has a variable rate. Nrt-VBR and ABR ATM service levels are the preferred choices for supporting CLS.

Table 3-1 lists some of the key parameters involved in mapping CLS, IP traffic to an Nrt-VBR, ATM service level.

TABLE 3-1

| AAL | |
|---|---|
| Type | 5 |
| Forward CPCS-SDU Size | parameter M of rcvr TSpec + 8 Bytes |
| Backward CPCS-SDU Size | parameter M of rcvr TSpec + 8 Bytes |
| SSCS Type | 0 (Null SSCS) |
| Traffic Descriptor | |
| Forward PCR CLP = 0 + 1 | |
| Backward PCR CLP = 0 + 1 | 0 |
| Forward SCR CLP = 0 | |
| Backward SCR CLP = 0 | 0 |
| Forward MBS (CLP = 0) | |
| Backward MBS (CLP = 0) | 0 |
| BE indicator | NOT included |
| Forward Frame Discard bit | 1 |
| Backward Frame Discard bit | 1 |
| Tagging Forward bit | 1 (Tagging requested) |
| Tagging Backward bit | 1 (Tagging requested) |
| Broadband Bearer Capability | |
| Bearer Class | 16 (BCOB-X) |
| ATM Transfer Capability | 10 (Non-real time VBR) |
| Susceptible to Clipping | 00 (Not Susceptible) |

TABLE 3-1-continued

| | |
|---|---|
| User Plane Configuration | 01 (Point-to-Multipoint) |
| Broadband Low Layer Information | |
| User Information Layer 2 | |
| Protocol | 12 (ISO 8802/2) |
| User Information Layer 3 | |
| Protocol | 11 (ISO/IEC TR 9577) |
| ISO/IEC TR 9577 IPI | 204 |
| QoS Class | |
| QoS Class Forward | 3 |
| QoS Class Backward | 3 |
| Extended QoS Parameters | |
| Acceptable Forward CDV | |
| Acceptable Forward CLR | |
| Forward Max CTD | |

Table 4 lists some of the key parameters involved in mapping CLS, IP traffic to an ABR, ATM service level.

TABLE 4

| AAL | |
|---|---|
| Type | 5 |
| Forward CPCS-SDU Size | parameter M of rcvr TSpec + 8 Bytes |
| Backward CPCS-SDU Size | parameter M of rcvr TSpec + 8 Bytes |
| SSCS Type | 0 (Null SSCS) |
| Traffic Descriptor | |
| Forward PCR CLP = 0 + 1 | |
| Backward PCR CLP = 0 + 1 | 0 |
| Forward MCR CLP = 0 + 1 | |
| Backward MCR CLP = 0 + 1 | 0 |
| BE indicator | NOT included |
| Forward Frame Discard bit | 1 |
| Backward Frame Discard bit | 1 |
| Tagging Forward bit | 0 (Tagging not requested) |
| Tagging Backward bit | 0 (Tagging not requested) |
| Broadband Bearer Capability | |
| Bearer Class | 16 (BCOB-X) |
| ATM Transfer Capability | 12 (ABR) |
| Susceptible to Clipping | 00 (Not Susceptible) |
| User Plane Configuration | 00 (Point-to-Point) |
| Broadband Low Layer Information | |
| User Information Layer 2 | |
| Protocol | 12 (ISO 8802/2) |
| User Information Layer 3 | |
| Protocol | 11 (ISO/IEC TR 9577) |
| ISO/IEC TR 9577 IPI | 204 |
| QoS Class | |
| QoS Class Forward | 0 |
| QoS Class Backward | 0 |
| Extended QoS Parameters | |
| Acceptable Forward CDV | |
| Acceptable Forward CLR | |
| Forward Max CTD | |
| ABR Setup Parameters | |
| ABR Additional Parameters | |

If CLS, IP traffic is to be mapped to a CBR or rt-VBR, ATM service level, then substantially the parameters shown in Tables 1-1 and 2-1 may be used.

An Adspec IP reservation message includes a message header, a Default General Parameters fragment and at least one of the following: Guaranteed Service fragment or Controlled-Load Service fragment. The Default General Parameters fragment includes fields which are updated at each RSVP-capable router along the path in order to present end-to-end values to the receivers. These fields include, Minimum Path Latency, Path Bandwidth, Global Break bit, and Path MTU. The Minimum Path Latency (summation of individual link latencies) represents the end-to-end latency in the absence of any queuing delay. In the case of Guaranteed Service, receivers can add this value to the bounded end-to-end queuing delay to obtain the overall bounded end-to-end delay. The Path Bandwidth is the minimum of individual link bandwidths along the path. The Global Break bit: is cleared when the Adspec is created by the sender. Encountering any routers that do not support RSVP will result in this bit being set to one. And, the Path MTU is the minimum of Maximum Transmission Units of individual links along the path.

For Guaranteed Service, the source Tspec contains peak rate, token bucket rate and bucket depth parameters: $p\_s$, $r\_s$ and $b\_s$. The receiver Tspec contains corresponding parameters $p\_r$, $r\_r$ and $b\_r$. The receiver Rspec also has a rate R which denote the bandwidth reserved by this receiver. For Controlled Load Service, the source Tspec contains peak rate, token bucket rate and bucket depth parameters: $p\_s$, $r\_s$ and $b\_s$. The receiver Tspec contains corresponding parameters $p\_r$, $r\_r$ and $b\_r$. The receiver Rspec also has a rate R which denote the bandwidth reserved by this receiver.

If, for example, IP Guaranteed Service is mapped into the ATM rt-VBR service category, the ATM traffic descriptor parameters (PCR, SCR, MBS) may be set as follows:

PCR=$p\_r$
SCR=$r\_r$
MBS=$b\_r$

Or, if IP Guaranteed Service is mapped into the ATM CBR service category, the value of the ATM PCR may be mapped to the Rspec rate $r\_r$ if the edge device has sufficient buffer. With little or no burst buffering, PCR=max ($r\_r$, $p\_r$).

IP Controlled Load Service may be mapped into the ATM rt-VBR service category, in which case the ATM traffic descriptor parameters (PCR, SCR, MBS) may be set as follows:

PCR=$p\_r$
SCR=$r\_r$
MBS=$b\_r$

Or, if IP Controlled Load Service is mapped into the ATM ABR service category, the minimal packet rate (MPR) parameter of ABR is set as $r\_r$. For Best Effort service there is no traffic description, so it is mapped into ATM UBR service class.

After mapping IP services into ATM service categories, the process proceeds from step 302 to step 304 where IP traffic is received. From step 304 the process proceeds to step 306 where the arriving IP traffic's ATM "equivalent" category is determined. From step 306 the process proceeds to step 308, where the hybrid switch's CAC is employed to establish a traffic path in a manner set forth in greater detail in the discussions related to FIGS. 4, 5, and 6. From step 308, the process proceeds to end in step 310.

For each inter-connecting link, such as link 102 between nodes A and B, the total bandwidth of the link is partitioned into a plurality of units and these units are allocated to STM or ATM traffic. If the packet switch fabric 232 supports a UTOPIA-II interface, the basic unit is an STS-1. If the switch fabric 232 supports a UTOPIA-III interface, the unit is an STS-3C. For example, if the link 102 is an OC192 link, and the switch fabric supports UTOPIA-Ill, the link is partitioned into 640C-3C based units. For each unit, there is one entry in an ingress and egress resource table, as follows:

Ingress Resource Table:

TABLE 1

| Tributary No. | Free Flag | Destination Address | Available Bandwidth | Status: Drop/Pass |
|---|---|---|---|---|

Egress Resource Table:

TABLE 2

| Tributary No. | Free Flag | Destination Address | Available Bandwidth | Status: Add/Pass |
|---|---|---|---|---|

The destination Address is either based on the IP address for this node or the proprietary address. For each ingress link, there is one ingress resource table associated with it. Correspondingly, there is one egress resource table for each egress link. It is assumed that there is at least one entry in each link's resource table.

At initialization time, all the free flags are initialized to have the value 0, indicating that the link is free. The available Bandwidth entry takes the initial value of the link's total physical transmission bandwidth, the Destination Address is initialized as 0, and Status is initialized as either Add (egress link) or Drop (ingress link).

At run time the various tributaries' resources may be allocated for different traffic categories with the allocations reflected in the ingress and egress resource tables. For example, resources may be allocated to CBR traffic from tributaries, starting with a top tributary number and working the way down, while other service categories may be allocated resources from the bottom up. Assume, for example that an egress link is an OC192 link. The link may be partitioned into 64 OC3 tributaries, in which case the link's associated egress table would have 64 entries, one for each tributary (also referred to herein as link traffic units). As traffic requests are received at the node (hybrid switch), resources are allocated, as set forth in greater detail in the discussion related to FIG. 4, to service the traffic. An source payload envelope (SPE) mapper may be configured to encapsulate a specific number of channels on the egress link. For example, two OC3C channels provisioned as non-path terminated at the next node, and an OC192 that is provisioned as path terminated at the next node. Additionally, the STS point processor of the inbound OC192 link on the next node would be configured to recognize and process these channels, again, as set forth in greater detail in the discussion related to FIG. 4. Traffic received at the "next" node will be processed first by the STS pointer processor in the nodes' I/O shelf, the two OC3C channels may then be served directly by a local STS crossconnect, thus avoiding the necessity of further processing though the UTOPIA interface. The OC192 channel may be sent directly to a centralized IP switch for further processing through a UTOPIA interface.

A number of ATM service categories, with their attendant quality of service requirements, have been defined and are listed in table 3:

TABLE 3

| Service Category | QoS |
|---|---|
| CBR | PLR $\leq \epsilon$ |
| | PDV $\leq \delta$ |
| | MaxPTD $\leq \gamma$ |
| rt-VBR | PLR $\leq \epsilon$ |
| | PDV $\leq \delta$ |
| | MaxPTD $\leq \gamma$ |
| nrt-VBR | PLR $\leq \epsilon$ |
| UBR | Best Effort |
| ABR | PLR $\leq \epsilon$ |

Where:
PLR=packet loss rate
PDV=packet delay variation
MaxPTD=maximum end-to-end packet transfer delay and
$\Delta$, $\delta$ and $\gamma$ are the corresponding system requirements.

In accordance with the principles of the present invention, traffic falling within the CBR and rt-VBR categories may be treated as "real-time" and switched through a hybrid switch's STM switch fabric. Each incoming ATM connection request is passed to the hybrid resource manager 202 which determines how the traffic is to be switched. In accordance with the principles of the present invention, specific types of ATM requests indicate that the associated ATM traffic is to be switched through a STM switch fabric within the hybrid switch. In this illustrative embodiment, all CBR type ATM traffic is routed by the hybrid resource manager 202 to an STM switch fabric.

Figure 4:
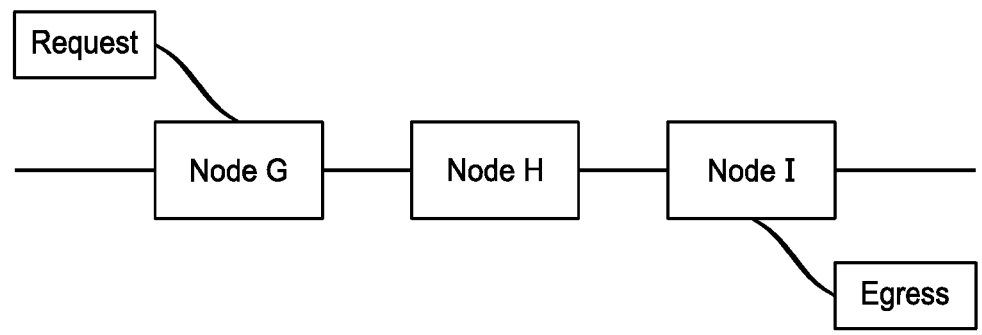
FIG. 4 is a conceptual block diagram of a telecommunications system that employs a plurality of hybrid switches in accordance with the principles of the present invention.

An overview of the process by which the resource manager 202 handles ATM connection requests will be provided in a discussion related to the conceptual block diagram of a three-Node telecommunications system of FIG. 4. Each of the nodes, G through I, is a hybrid telecommunications switch in accordance with the principles of the present invention. Assuming that CBR type ATM traffic originates at Node G and has a destination of Node I STM bandwidth that has already been provisioned for ATM traffic within each of the nodes, and other resources, such as buffer space, is dynamically allocated to the CBR request. For example an ATM request originating at Node G with a destination of Node I would be passed along to Node I and with each subsequent node along the path examining its routing table, as well as the availability of buffers and ingress and egress bandwidth.

Each node's hybrid resource manger could perform this operation. Each node in the path determines whether it has the available resources, whether for pass-through or destination operations, depending upon whether it's routing table indicates it is the destination node or not. If each node within the path has the available capacity (for example, ingress and egress bandwidth and buffers), the destination node affirms the ATM request and this affirmation is returned, node to node, to the ingress node (Node G in this example). In this way, resources, including STM switch fabrics within each node, are dynamically provisioned for CBR type ATM traffic in the illustrative network.

Figure 5:
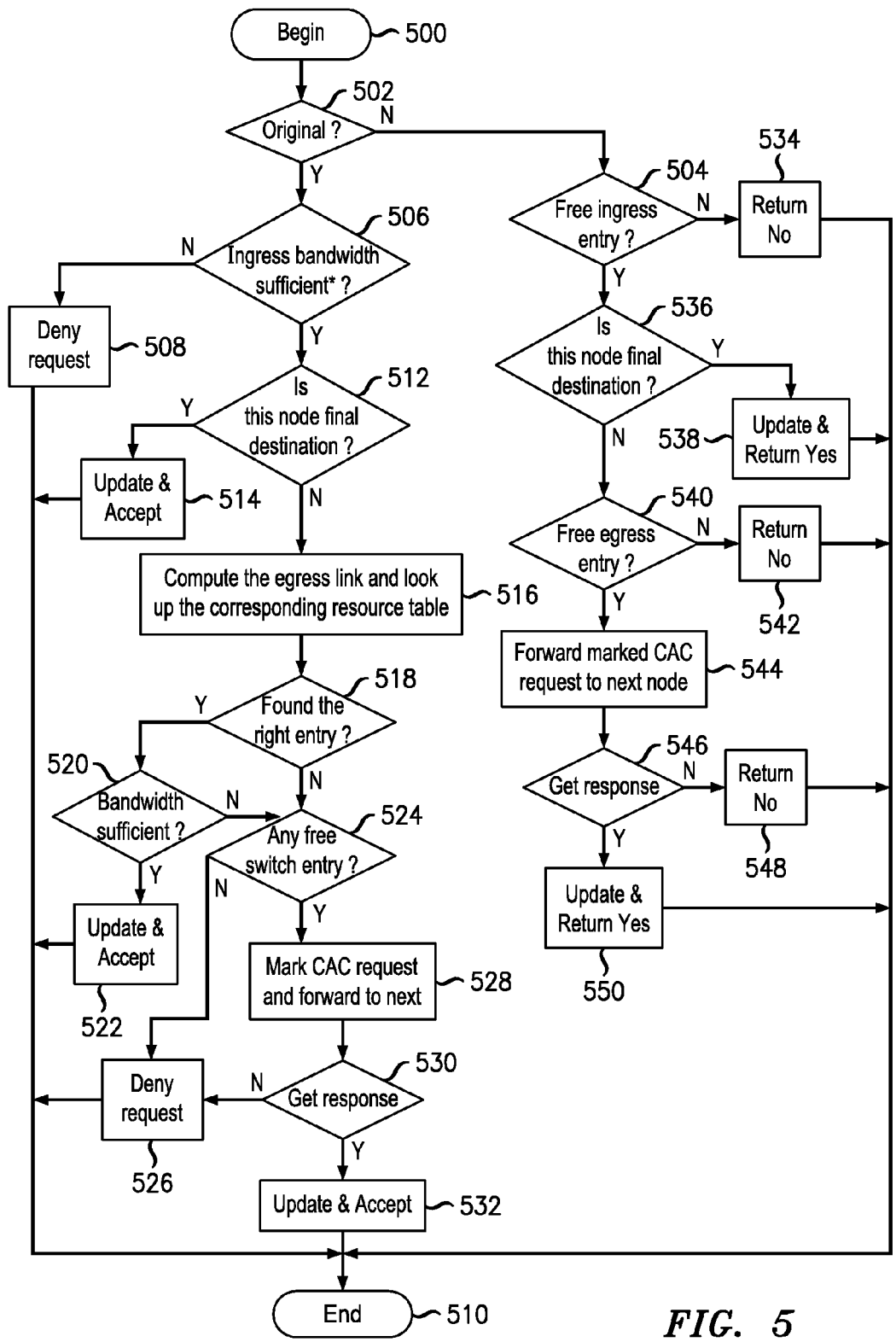
FIG. 5 is a flow chart that depicts the switching of IP traffic which has been mapped into ATM CBR traffic in a hybrid switch in accordance with the principles of the present invention.

The flowchart of FIG. 5 illustrates in greater detail the process by which the resource manager 202, through connection admission control, determines the manner in which ATM traffic is to be switched, should the incoming service request indicate that the traffic is CBR traffic. The process begins in step 500, where the resource manager 202 determines that a received connection request is a CBR request. In this illustrative embodiment, all CBR type ATM requests are routed to a STM switch fabric for switching. The process then proceeds to step 502, where the resource manager 202 determines whether the ATM connection request is an "original" CBR request. That is, the resource manger 2021 determines whether the node receiving the request, the node associated with the resource manager, is the first node to receive the request, or the request is a pass-through request. If the request is not an original request, the process branches to step 504, which step will be described below.

If the request is an "original" request, the process proceeds to step 506, where the resource manager determines whether the switch has sufficient ingress bandwidth to service the request. If there is not sufficient bandwidth for the request, the resource manager denies the request in step 508 and the process proceeds to end in step 510. Bandwidth may be provisioned for different ATM service categories in a variety of ways. For example, all link traffic units, such as OC-3C traffic units, as previously discussed, may initially be "free", and their availability would be reflected by a "0" entry in a corresponding ingress resource table. In response to a connection request having a specific service type, the resource manager determines whether the allocated bandwidth for the specific service category is sufficient for the request and, if bandwidth is available, the resource manager incrementally allocates the bandwidth for the service category. After allocating the bandwidth, the resource manager alters the resource table to reflect the allocation by changing the corresponding "Free Flag" from "0" to "1." Consequently, the resource manager may attempt to allocate the necessary ingress bandwidth, "on the fly" as the request is received and only deny the request if the bandwidth cannot be allocated in the manner just described.

If there is sufficient ingress bandwidth, the process proceeds to step 512 where the resource manager employs the node's routing tables, as previously described in the discussion related to FIG. 4, to determine whether the node is the final destination for the related CBR traffic. If the node is the final destination, the process proceeds to step 514 where the resource allocation state is updated, that is, the resource availability information in the resource allocation table is modified to reflect changes, and a request acceptance is returned. From step 514 the process proceeds to end in step 510. If, on the other hand, the node is not the final destination for the CBR traffic, the process proceeds from step 512 to step 516. In step 516, based upon information contained within the CBR request, the next node and corresponding egress link are computed and the egress link's resource table is located. The process then proceeds to step 518, where the resource manager examines the egress link's corresponding egress resource table. If resources have not yet been allocated for CBR traffic to the destination address, the egress resource table for the link will not have an entry for that address. Therefore, if the resource manager determines that there is no entry within the resource table for the destination address, the process proceeds to step 524, which will be described after step 522.

On the other hand, if there is an entry for the destination address, the process proceeds to step 520 where it is determined whether the bandwidth allocated for CBR traffic to the destination address is sufficient for the current request. If there is sufficient bandwidth, the process proceeds to step 522 where the request is accepted, the available bandwidth information is modified to reflect the allocation of bandwidth to the traffic whose request has just been accepted, and the process proceeds to end in step 510. If, in step 520, it is determined that there is insufficient available bandwidth, the process proceeds to step 524. In step 524 the resource manager determines, from the resource table, whether there are "free" resources that may be allocated to CBR traffic for the destination address that are sufficient to handle the CBR request. If there are not, the process proceeds to step 526, where the request is denied, and, from there, to end in step 510. If, on the other hand, it is determined in step 524 that there are sufficient "free" resources to handle the CBR request, the process proceeds to step 528. In step 528, the CBR request is marked as a "passthrough" request and sent to the next node, which may or may not be the destination node. The resource manager then awaits a reply from the next node indicating whether the remaining node(s) in the path, including the egress node, accept the CBR request.

If the response from the remaining nodes is a request rejection, or timeout, the process proceeds to step 526 and from there as previously described. If the response is an acceptance from the other nodes, the process proceeds to step 532, where the resource manager accepts the CBR request. Additionally, the resource manager updates the egress resource table entry by setting the Free Flag to "1", sets the destination address entry as the destination address of the CBR request, modifies the available bandwidth entry by subtracting the bandwidth required for the CBR traffic request just accepted and sets the status as "Add". The CBR bandwidth that is subtracted from the available bandwidth entry is indicated by the PCR parameter of the CBR service request. From step 532 the process proceeds to end in step 510.

Returning to step 504, the resource manager determines whether the resource table indicates that resources are free to service the incoming CBR traffic and, if not, the process proceeds to step 534 where the node rejects the request and, from there, to end in step 510. If the resource entry indicates there are resources available for the requesting traffic, the process proceeds to step 536, where the resource manager determines whether the node is the destination of the CBR connection. If the node is the destination node the process proceeds to step 538, where the tributary, such as an OC3c, is provisioned as a path termination tributary, the Free Flag of the corresponding ingress resource table is set to "1" and the status is updated to "Drop", indicating that this node is the destination, or "drop" node for the corresponding traffic. The resource manager also returns an acceptance of the request and the process proceeds to end in step 510.

If the node is not the destination node for the CBR request, the process proceeds from step 536 to step 540 where, based on information contained within the CBR request, the resource manager computes the next node and corresponding egress link. The resource table for the egress link is then examined to determine whether there is a "free" resource entry. If the resource entry is not "Free", the process proceeds to step 542, where the node rejects the CBR request and, from there, to end in step 510. If the resource table entry indicates that the unit's resources are "Free" the process proceeds from step 540 to step 544 where the CBR request is forwarded to the next node and the resource manager awaits a response. When a response is received, the process proceeds to step 546 where, if the response from a downstream node is negative, the process proceeds to step 548 where the resource manager passes this rejection back to the requesting party. From step 548, the process proceeds to end in step 510. If the response from the downstream nodes were affirmative, the resource manager provisions the ingress and egress tributaries as pass-through, returns an acceptance to the requesting party and updates the ingress and egress resource tables to indicate that the status is "Pass", and the Free Flag is set equal to "1". From step 550, the process proceeds to end in step 510.

The flowchart of FIG. 5 illustrates in greater detail the process by which the resource manager 202, through connection admission control, determines the manner in which ATM traffic is to be switched, should the incoming service request indicate that the traffic is rt-VBR traffic. In one aspect of the invention, the resource manager may be instructed to route all rt VBR requests to either an STM switch or an IP switch, at the option of a service provider, for example. Otherwise, the resource manager 202 may determine whether rt-VBR traffic should be served through a circuit path (that is, through an STM switch fabric within the hybrid switch). This determination may be based on an internal system parameter $\phi$, a packet rate ratio threshold, as follows:

employ an STM switch for rt-VBR traffic if PPR/SPR$\leq\phi$ where:
PPR=peak packet rate
SPR=sustained packet rate
$\phi$=packet rate ratio threshold If the rt-VBR traffic is served by an IP switch, the effective bandwidth required for the request may be computed on the request's associated service contract. The service contract will typically include quality of service requirements, such as delay, packet loss ratio, and the nature of the traffic, which might include, average rate, peak rate, and burst period.

Figure 6:
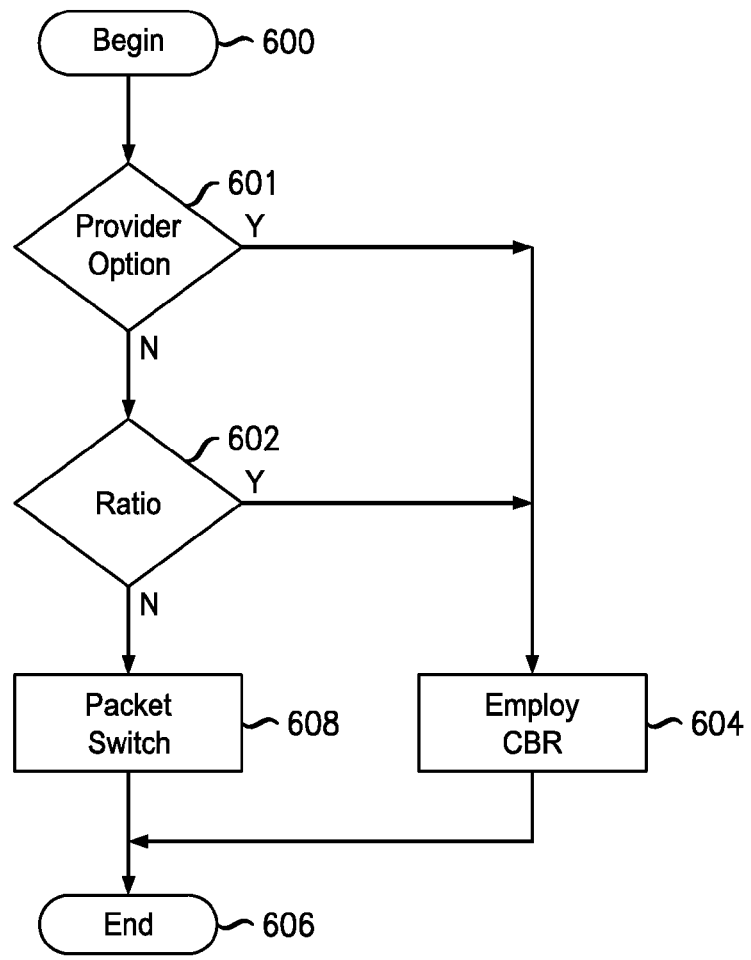
FIG. 6 is a flow chart that depicts the switching of IP traffic which has been mapped into ATM rt-VBR traffic in accordance with the principles of the present invention.

Requests for rt-VBR traffic may be handled as described in relation to the flow chart of FIG. 6, in which the process begins in step 600. In step 600 it is assumed that the traffic request has already been determined to be an rt-VBR request. The process proceeds to step 601, where the resource manager determines whether a service provider has elected to switch all rt-VBR traffic in the same manner as CBR traffic. This election may be evidenced by a flag that has been set, for example. If the service provider has elected to treat all rt-VBR traffic as CBR traffic, that is, in the manner described in the discussion related to FIG. 5, the process proceeds to step 604, where the procedures set forth in the discussion related to FIG. 5 are employed to switch the traffic. If the service provider has not elected in this manner to treat all rt-VBR traffic as CBR traffic, the process proceeds to step 602, where the resource manager determines whether the rt-VBR traffic is to be switched in a conventional ATM switching manner, such as a linear approximation ATM switching process, or it is to be switched in the same manner as CBR traffic. The resource manager may make this determination using the peak-to-sustained packet rate ratio, opting to switch vt-VBR traffic in the same manner as CBR traffic if the ratio is less than a predetermined threshold value, for example.

If the rt-VBR traffic is to be switched as CBR traffic, that is, in the manner described in the discussion related to FIG. 5, the process proceeds to step 604, where the procedures set forth in the discussion related to FIG. 5 are employed to switch the traffic. After switching the traffic in this manner, the process proceeds to end in step 606. If, in step 602, the resource manager 202 determines that vt-VBR traffic is to be switched using conventional ATM switching techniques, the process proceeds to step 608, where the switching takes place. From step 608, the process proceeds to end in step 606. IP traffic that has been mapped into other ATM service categories may be switched using conventional ATM switching techniques.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A hybrid telecommunications switch comprising:
at least one circuit switch fabric;
at least one packet switch fabric; and
a controller configured to route IP traffic to the circuit switch fabric or packet switch fabric, depending on an ATM service category of the IP traffic.

2. The switch of claim 1 wherein a portion of the circuit switch fabric resources are provisioned for circuit switched traffic and the remaining portion of the circuit switch fabric resources are allocated to IP traffic as the controller routes IP traffic to the circuit switch fabric.

3. The switch of claim 2 wherein the controller is further configured to allocate circuit switch fabric resources to traffic falling within an ATM service category.

4. The switch of claim 3 wherein the controller is further configured to route IP traffic associated with a constant bit rate (CBR) ATM service category to the circuit switch fabric.

5. The switch of claim 3 wherein the controller is further configured to route IP traffic associated with a real time variable bit rate (rt-VBR) ATM service category to the circuit switch fabric.

6. The switch of claim 3 wherein the controller is further configured to route IP traffic associated with an ATM service category which is neither CBR nor rt-VBR traffic to the IP switch fabric.

7. The switch of claim 3 wherein the controller is further configured to allocate available circuit switch resources, as indicated by a resource table, to received IP traffic requests.

8. The switch of claim 7 wherein the controller is further configured to maintain circuit switch ingress and egress resource tables.

9. The switch of claim 7 wherein the controller is further configured to pass an IP traffic request to a destination node and to establish an IP traffic path after having determined that all nodes along the proposed traffic path have accepted an IP traffic request.

10. The switch of claim 9 wherein the controller is further configured to determine whether IP traffic associated with the rt-VBR ATM service category is to be routed through the circuit switch fabric.

11. The switch of claim 10 wherein the controller is further configured to determine whether IP traffic associated with the rt-VBR ATM service category is to be routed through the circuit switch fabric based upon a peak to sustained packet rate ratio.

12. A method for routing telecommunications traffic in a hybrid telecommunications switch comprising at least one packet switch fabric, at least one circuit switch fabric, and a controller, including the step of:
routing IP traffic to the circuit switch fabric or packet switch fabric, depending on an ATM service category of the IP traffic.

13. The method of claim 12 further comprising the step of:
provisioning a portion of the circuit switch fabric resources for circuit switched traffic, and
allocating the remaining portion of the circuit switch fabric resources to IP traffic as a controller routes the IP traffic to the circuit switch fabric.

14. The method of claim 13 further comprising the step of: allocating circuit switch fabric resources to IP traffic.

15. The method of claim 13 further comprising the step of: routing IP traffic associated with a CBR ATM service category to the circuit switch fabric.

16. The method of claim 13 further comprising the step of: routing IP traffic associated with an rt-VBR ATM service category to the circuit switch fabric.

17. The method of claim 13 further comprising the step of: routing IP traffic not associated with the CBR or rt-VBR ATM service categories to the IP switch fabric.

18. The method of claim 13 further comprising the step of: allocating available circuit switch fabric resources, as indicated by a resource table, to IP traffic requests.

19. The method of claim 13 further comprising the step of: maintaining circuit switch ingress and egress resource tables.

20. The method of claim 13 further comprising the step of: passing an IP traffic request to a destination node.

21. The method of claim 20 further comprising the step of: determining that all nodes along the proposed IP traffic path have allocated circuit switch fabric resources for the IP traffic.

22. The method of claim 21 further comprising the step of: establishing an IP traffic path after the determination step.

23. The method of claim 21 further comprising the step of: determining whether IP traffic associated with the rt-VBR ATM service category is to be routed through an IP switch fabric or the circuit switch fabric, wherein the IP switch fabric is one kind of packet switched fabric.

24. The method of claim 23 further comprising the step of: comparing a sustained packet ratio to a threshold value.

25. The switch of claim 9 wherein the controller is further configured to pass an IP traffic request to a destination node.

26. The switch of claim 9 wherein the controller is further configured to determine that all nodes along a proposed IP traffic path allocate circuit switch fabric resources for IP traffic.

27. The switch of claim 26 wherein the controller is further configured to establish an IP traffic path after determining that all nodes along a proposed IP traffic path allocate circuit switch fabric resources for IP traffic.

28. A hybrid telecommunications switch comprising:
at least one circuit switch fabric;
at least one packet switch fabric;
a controller configured to:
route IP traffic to the circuit switch fabric or packet switch fabric, depending on an ATM service category of the IP traffic;
allocate circuit switch fabric resources to traffic falling within an ATM service category; and
allocate available circuit switch resources, as indicated by a resource table, to received IP traffic requests.

29. The switch as in claim 28 wherein the controller is further configured to maintain circuit switch ingress and egress resource tables.

30. The switch as in claim 28 wherein the controller is further configured to pass an IP traffic request to a destination node and to establish an IP traffic path after having determined that all nodes along the proposed traffic path have accepted an IP traffic request.

31. The switch as in claim 30 wherein the controller is further configured to determine whether IP traffic associated with an rt-VBR ATM service category is to be routed through the circuit switch fabric.

32. The switch as in claim 31 wherein the controller is further configured to determine whether IP traffic associated with the rt-VBR ATM service category is to be routed through the circuit switch fabric based upon a peak to sustained packet rate ratio.

33. A method for routing telecommunications traffic in a hybrid telecommunications switch comprising at least one packet switch fabric, at least one circuit switch fabric, and a controller, including the step of:
routing IP traffic to the circuit switch fabric or packet switch fabric, depending on an ATM service category of the IP traffic;
provisioning a portion of the circuit switch fabric resources for circuit switched traffic;
allocating the remaining portion of the circuit switch fabric resources to IP traffic as a controller routes the IP traffic to the circuit switch fabric; and
allocating available circuit switch fabric resources, as indicated by a resource table, to IP traffic requests.

34. The method as in claim 33 further comprising the step of maintaining circuit switch ingress and egress resource tables.

35. The method as in claim 33 further comprising the step of passing an IP traffic request to a destination node.

36. The method as in claim 33 further comprising the step of determining that all nodes along the proposed IP traffic path have allocated circuit switch fabric resources for the IP traffic.

37. The method as in claim 36 further comprising the step of establishing an IP traffic path after the determination step.

38. The method as in claim 36 further comprising the step of determining whether IP traffic associated with an rt-VBR ATM service category is to be routed through an IP switch fabric or a circuit switch fabric.

39. The method as in claim 38 further comprising the step of comparing a sustained packet ratio to a threshold value.

40. The switch as in claim 30 wherein the controller is further configured to pass an IP traffic request to a destination node.

41. The switch as in claim 30 wherein the controller is further configured to determine that all nodes along a proposed IP traffic path allocate circuit switch fabric resources for IP traffic.

42. The switch as in claim 41 wherein the controller is further configured to establish an IP traffic path after determining that all nodes along a proposed IP traffic path allocate circuit switch fabric resources for IP traffic.

* * * * *